June 15, 1937. S. E. BOUCHARD 2,083,772
OPHTHALMIC MOUNTING
Filed Feb. 1, 1936

SAMUEL E. BOUCHARD
INVENTOR.
BY
ATTORNEYS

Patented June 15, 1937

2,083,772

UNITED STATES PATENT OFFICE 2,083,772

OPHTHALMIC MOUNTING

Samuel E. Bouchard, Rochester, N. Y., assignor to Bausch & Lomb Optical Company, Rochester, N. Y., a corporation of New York Application February 1, 1936, Serial No. 61,974

5 Claims. (Cl. 88—42)

This invention relates to ophthalmic mountings and more particularly it has reference to devices for holding lenses in frames. One object of the invention is to provide an improved ophthalmic mounting which will be relatively simple in structure yet efficient in use. Another object is to provide improved means for connecting the split ends of a lens holding rim. These and other objects and advantages reside in certain novel features of construction, arrangement and combination of parts as will hereinafter be more fully described and pointed out in the appended claims.

Referring to the drawing.

Figure 1:
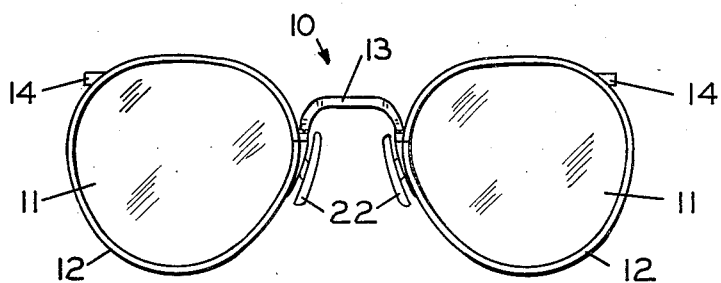
Fig. 1 is a front view of a spectacle frame embodying my invention.
Figure 2:
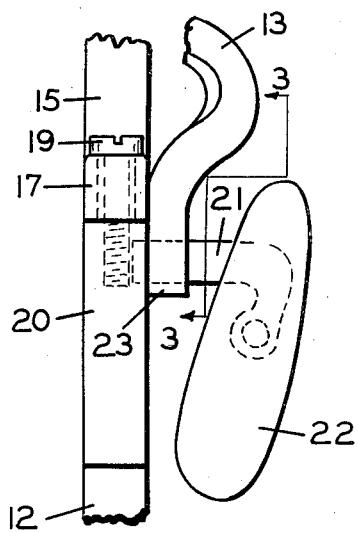
Fig. 2 is an enlarged fragmentary view showing the rim connections.
Figure 3:
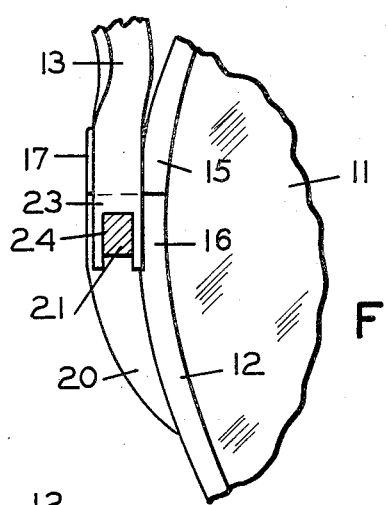
Fig. 3 is a view taken on line 3—3 of Fig. 2.
Figure 4:
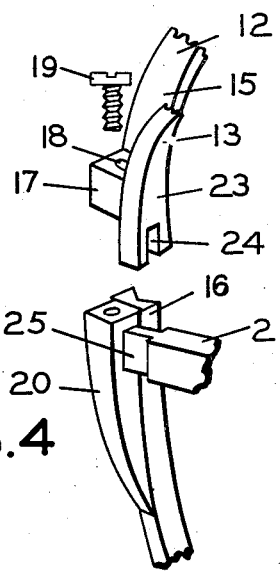
Fig. 4 is a fragmentary view showing the rim connection parts in separated relation.

A preferred embodiment of the invention is illustrated in the drawing wherein 10 indicates, generally, a spectacle frame comprising a pair of lenses 11 held in the rims 12 which are connected by bridge 13. Each rim 12 is provided with an endpiece 14 to which is pivotally mounted a temple, not shown, in the usual manner.

The lens rim or eyewire 12 is split so as to provide the two adjacent ends 15 and 16 and thereby permit the insertion or removal of lens 11. Secured to the end 15, as by soldering, is the lug 17 having an aperture 18 adapted to receive a screw 19 which is threaded into lug 20 secured to the end 16 of rim 12. The lugs 17 and 20 are substantially flush with the rim ends 15 and 16. It will thus be obvious that the lens 11 may be removably inserted in the rim 12.

Figure 5:
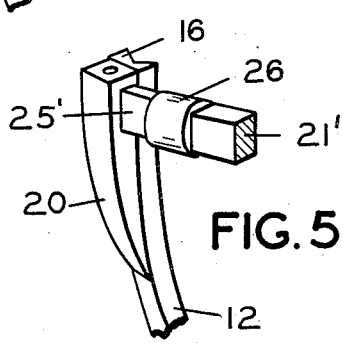
Fig. 5 is a view showing a modified detail.

Secured to the lug 20 is a rearwardly extending arm 21 carrying a nose engaging pad 22. The bridge 13 has a foot 23 which is preferably soldered to the rear side of lug 17. The foot 23 extends down below the rim end 15 and has, at its extremity, a notch or recess 24 which fits down on and receives the reduced portion 25 on the pad arm 21. Since the reduced portion 25 adjoins the rear face of lug 20 the foot 23 of bridge 13 fits snugly into place. Hence the rim end 15, on which bridge 13 is carried, is constrained against lateral movement, in any direction, with respect to rim end 16. This affords a simple yet efficient means for securing the lens rim ends against lateral movement and constitutes an important feature of my invention. The reduced portion 25 may be formed on the end of pad arm 21 by any suitable means. In Fig. 5, for example, the pad arm 21' is made by flattening a round wire excepting at portion 26 so as to provide a reduced portion 25' for receiving the notch 24 in the bridge foot 23.

From the foregoing it will be noted that I have attained the objects of my invention and provided a simple, yet efficient, connection for the ends of lens rims which will afford ample strength and security. Various modification can obviously be made without departing from the spirit of my invention.

I claim:

1. In an ophthalmic mounting, the combination of a split lens rim having adjacent ends, a bridge secured to said rim, said bridge having a portion extending beyond one end of the rim, a pad arm carried by the other end of said rim, the projecting portion of said bridge having a cutaway part against which said arm is positioned.

2. In an ophthalmic mounting the combination of a split lens rim having adjacent ends, a bridge secured to said rim, said bridge having an extension projecting beyond one end of said rim, an arm secured adjacent to the other end of the rim, said extension having a slot within which said arm is positioned and means for holding said ends together.

3. In an ophthalmic mounting the combination of a split lens rims having adjacent ends, a bridge secured at one of said ends, said bridge having an integral extension projecting beyond said end, a pad arm secured to the other end of the rim, said pad arm having a reduced portion, said extension having a notch which receives said reduced portion, and means for holding said ends together.

4. In an ophthalmic mounting the combination of a split lens rim having adjacent ends, a lug secured to each end of said rim, a bridge secured to one of said lugs and having an extension projecting below that end of the rim to which is secured that lug to which the bridge is secured, a pad arm secured to the other end of the rim adjacent to said other lug, said arm having a reduced portion next to said last-named lug, said extension having a notch which fits snugly onto said reduced portion, and detachable means for connecting said lugs.

5. An ophthalmic mounting comprising a pair of split lens rims each having adjacent upper and lower ends, a bridge connecting the upper ends of the two rims, said bridge having an extension projecting below the upper end of each rim, a pad arm secured to each of the lower ends, a nose engaging member carried by each arm, each extension of said bridge having a recess for receiving the adjacent arm and means for holding together the ends of each rim.

SAMUEL E. BOUCHARD.